(12) United States Patent
Crowe

(10) Patent No.: US 10,220,789 B2
(45) Date of Patent: Mar. 5, 2019

(54) BAGGAGE RESTRAINT SYSTEM

(71) Applicant: Ben Ross Crowe, Calgary (CA)

(72) Inventor: Ben Ross Crowe, Calgary (CA)

( * ) Notice: Subject to any disclaimer, the term of this patent is extended or adjusted under 35 U.S.C. 154(b) by 4 days.

(21) Appl. No.: 14/732,986

(22) Filed: Jun. 8, 2015

(65) Prior Publication Data

US 2016/0355141 A1     Dec. 8, 2016

(51) Int. Cl.
| | |
|---|---|
| *B60R 5/00* | (2006.01) |
| *B60P 7/04* | (2006.01) |
| *B60P 7/06* | (2006.01) |
| *B60P 7/08* | (2006.01) |

(52) U.S. Cl.
CPC .............. *B60R 5/003* (2013.01); *B60R 5/00* (2013.01); *B60P 7/04* (2013.01); *B60P 7/0876* (2013.01)

(58) Field of Classification Search
CPC B60R 5/003; B60R 5/045; B60R 7/04; B60R 7/043; B60R 7/08; B60R 2011/0003; B60R 2011/0012; B60R 2011/0028; B60R 2011/0029; B60R 2011/0052; B61D 45/001; B61D 45/002; B61D 45/006; B61D 45/007; B60P 7/08; B60P 7/10; B60P 7/14; B60P 7/02; B60P 7/06; B60P 7/04; B60P 7/0876
USPC .......... 410/100, 106, 110, 97, 118; 224/583, 224/404, 318, 563, 572
See application file for complete search history.

(56) References Cited

U.S. PATENT DOCUMENTS

| | | | | |
|---|---|---|---|---|
| 2,455,237 | A | * | 11/1948 | Davis .................... B60P 7/0876 150/154 |
| 2,756,693 | A | * | 7/1956 | Frost ..................... B60P 7/0807 410/111 |
| 3,659,641 | A | * | 5/1972 | Marino .............. B65D 71/0096 206/597 |
| 3,891,263 | A | | 6/1975 | Orsulak |
| 4,911,317 | A | * | 3/1990 | Schloesser ........... B65D 90/046 220/1.5 |
| 5,354,119 | A | | 10/1994 | Nicholas |
| 5,388,702 | A | * | 2/1995 | Jones .................... B65D 19/44 150/154 |
| 5,474,329 | A | | 12/1995 | Elwyn |
| 5,529,341 | A | | 6/1996 | Hartigan |
| 6,213,696 | B1 | * | 4/2001 | Austin ................. B60N 2/2806 410/101 |
| 6,742,837 | B1 | | 6/2004 | Alexander |
| 7,287,813 | B2 | | 10/2007 | Aliev |
| 7,309,102 | B1 | | 12/2007 | Davis |

(Continued)

*Primary Examiner* — Justin Larson

(57) ABSTRACT

A baggage restraint system for the containment of luggage and other personal or group articles, such as camping gear or sport equipment, to the confines of two or more successive seats in a commercial passenger vehicle, such as a school bus. The system comprises an enclosure, and the means by which it may be releasably secured to the vehicle cabin floor. The system's enclosure is constructed of tear-resistant fabric panels, as an essentially rectangular or forward-leaning, four-sided cuboid. The enclosure is shaped and dimensioned to envelope a predetermined number of seats in a target vehicle. The system's means of securement include: a plurality of depending loops, affixed along one or more of the enclosure's bottom and windows-side edges; a plurality of floor and sidewall anchor tabs; and a plurality of carabiners and adjustable straps, linking each anchor tab to one of the depending loops.

17 Claims, 6 Drawing Sheets

(56) References Cited

U.S. PATENT DOCUMENTS

| | | | | |
|---|---|---|---|---|
| 7,416,091 B2* | 8/2008 | Yong | ...................... | B65D 90/046 |
| | | | | 220/1.6 |
| 7,506,776 B2* | 3/2009 | Podd | ...................... | B65D 90/046 |
| | | | | 220/1.6 |
| 8,220,416 B1 | 7/2012 | Stahl | | |
| 8,408,642 B1 | 4/2013 | Reidy | | |
| 9,101,199 B1* | 8/2015 | Harry | ........................ | A45F 4/02 |
| 2001/0050499 A1 | 12/2001 | DeLoach | | |
| 2006/0208020 A1* | 9/2006 | Albert | ..................... | A45C 11/24 |
| | | | | 224/275 |
| 2012/0181316 A1* | 7/2012 | McLennan | ............ | B60P 7/0823 |
| | | | | 224/572 |
| 2013/0082491 A1 | 4/2013 | Rapkin | | |
| 2014/0151424 A1* | 6/2014 | Hexels | ...................... | A45F 3/06 |
| | | | | 224/637 |

* cited by examiner

BAGGAGE RESTRAINT SYSTEM

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

I. Field of the Invention

The present invention relates generally to baggage containment enclosures, and particularly to systems designed to contain luggage and other personal or group articles to within the space occupied by a number of successive seats in a commercial passenger vehicle.

II. Brief Description of the Prior Art

The need to securely carry luggage and other personal articles in a passenger vehicle arose as an immediate corollary to the advent of the motorcar, as the solution to the need for passenger transportation. Waterlogged luggage and trails of personal belongings littering long stretches of roads have quickly proved the inadequacy of lashing trunks externally onto vehicles, prompting vehicle designs to include a capacious, enclosed luggage compartment. This, of course, has become a standard feature of automobiles and of intercity commercial passenger vehicles. Commercial vehicles intended for local passenger transportation however, such as city busses and school busses, typically lack a dedicated luggage compartment, as there is no operational need, normally, for such functionality during their intended use. Nevertheless, school busses and other commercial passenger vehicles normally intended for local routes are, on occasion, used for longer trips, requiring the carriage of personal luggage and, often, personal and group sport equipment, camping gear, and the like (collectively termed "baggage", hereafter and in the appended claims).

Commonly, on such occasions, baggage is heaped upon and underneath vacant seats, and/or stowed in the centre aisle. Ordinarily, unless the vehicle balance is disrupted or the driver's view is obstructed, this practice poses no serious problem. But should a situation arise where the vehicle must be decelerated rapidly or brought to an abrupt stop, or is involved in an accident, unsecured baggage becomes a serious risk. Baggage objects may become displaced following such events, block the aisle and impede rapid egress and access to injured passengers by emergency response personnel, or be projected violently and strike passengers.

It is always prudent—to reduce the possibility of injury, as described above—to secure or restrain baggage properly when stowed on a car seat or in the cargo area of a station wagon; indeed, several devices are found in the prior art designed for this purpose. In the case of a commercial passenger vehicle, proper baggage stowage is vitally important.

Baggage restraint devices intended for cars appear in several forms in the prior art: containers for small items, which are secured to a car seat by various means (e.g. U.S. Pat. No. 6,276,582; Alexander, 2001 and U.S. Pat. No. 5,687,893; Jaocbsmeyer, 1997); enclosures of netting or other pliable material, which embrace, at least in part, the seat portion and the backrest of a car seat (e.g. U.S. Pat. No. 8,408,642; Reidy, 2013 and U.S. Pat. No. 7,309,102; Davis, 2007); pet enclosures (e.g. U.S. Pat. No. 5,474,329; Wade, 1995 and U.S. Pat. No. 7,287,813; Aliev 2007); restraining nets for reclining passengers (e.g. U.S. Pat. No. 5,529,341; Hartigan, 1996 and U.S. Pat. No. 4,630,324; Fligsten, 1986); station wagon cargo area partitions (e.g. US2013221697; Steinbrecher, 2013 and U.S. Pat. No. 3,891,263; Orsulak, 1975). Although presumably effective in their intended use, none of these solutions is transferable to a multi-passenger commercial vehicle for the containment of a baggage volume that is beyond the capacity of a single seat or bench.

In the commercial realm, baggage restraint devices appear as tonneau nets (e.g.

U.S. Pat. No. 5,328,310; Lockney, 1994 and U.S. Pat. No. 6,017,174; Ross, 2000), which are essentially rectangular enclosures designed to be fastened to the external cargo bed of a truck, and are not easily adaptable to encompass a plurality of seats in a passenger vehicle; barriers and partitions designed to separate the cargo area from the operator (e.g. US2001033084; Murray, 2001 and U.S. Pat. No. 6,983,970; Bateman, 2006), which are essentially planiform in shape and, again, are not adaptable to flexibly contain baggage to within any plurality of seats in a commercial passenger vehicle; sectioning devices (e.g. U.S. Pat. No. 5,427,486; Green, 1995 and U.S. Pat. No. 5,121,958; Goeden, 1992 and U.S. Pat. No. 4,781,498A; Cox, 1988), which are designed to adaptably contain partial loads, but being generally of a simple planiform design are not suitable to encompass a plurality of passenger seats.

It appears that the challenge of transporting voluminous baggage safely within the passenger cabin of a commercial passenger vehicle has not hitherto been met. The present invention addresses this challenge with a simple, effective solution.

SUMMARY OF THE INVENTION

It is the principal object of this invention to provide a restraint system for the containment of baggage to within the space occupied by a predetermined number of successive seats in the cabin of a commercial passenger vehicle.

A second, more specific object of this invention is to provide a restraint system as described above, which is strong but light, and which can be manufactured cheaply.

A third specific object of this invention is to provide a restraint system as described above, which may be easily installed when needed, and readily removed when not needed.

A forth, further specific object of this invention is to provide a restraint system as described above, which requires minimal modification to the structure of the host vehicle.

The foregoing objectives are achieved through corresponding aspects of the invention, as outlined below:

A first aspect of the present invention is a four-sided enclosure, dimensioned and shaped to closely fit over a predetermined number of seats in a commercial passenger vehicle.

A second aspect of the present invention is a pliable sewn construction formed of durable fabric or strap netting.

A third aspect of the present invention is an adaptable means of securement of the enclosure to the cabin structure, comprising engagement loops or grommet eyes, conventional linking carabiners, floor-based anchor tabs, and adjustable straps.

A forth aspect of the present invention is the coupling of the aforesaid anchor tabs to seat-mount fixtures, and the engagement of the aforesaid adjustable straps with seat frame members.

These and other objects and features of the present invention are fully expounded hereinafter in the description of the preferred embodiments, in which references are made to accompanying drawings, described next.

DETAILED DESCRIPTION OF THE INVENTION

Figure 1:
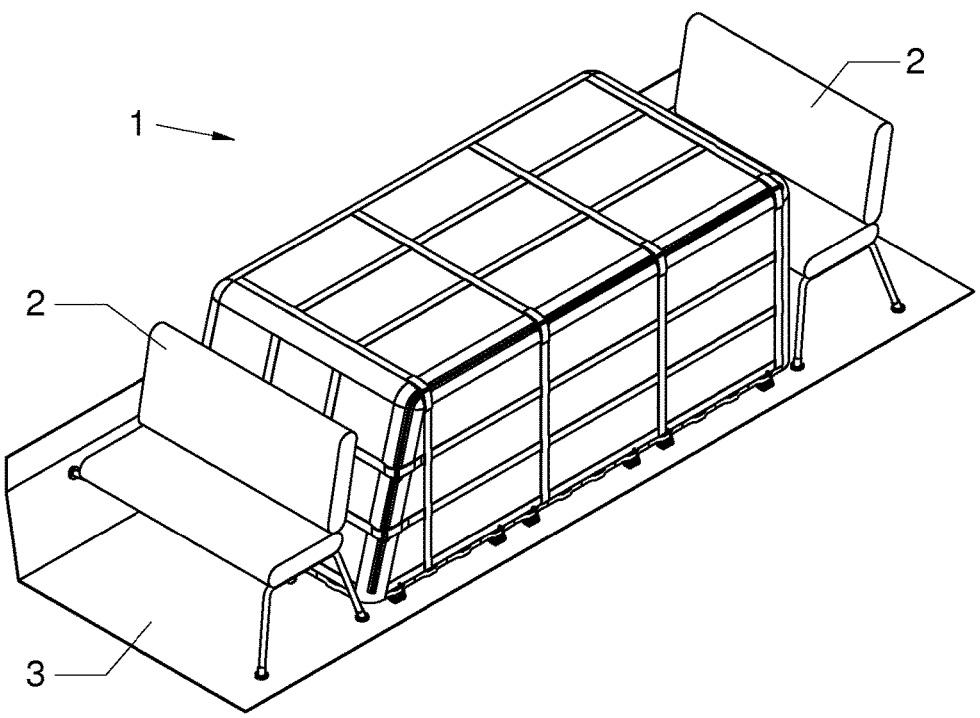
FIG. 1 An isometric view of a first configuration of the baggage restraint system according to the present invention, in situ with the immediately adjacent seats, as seen from the centre aisle side.
Figure 2:
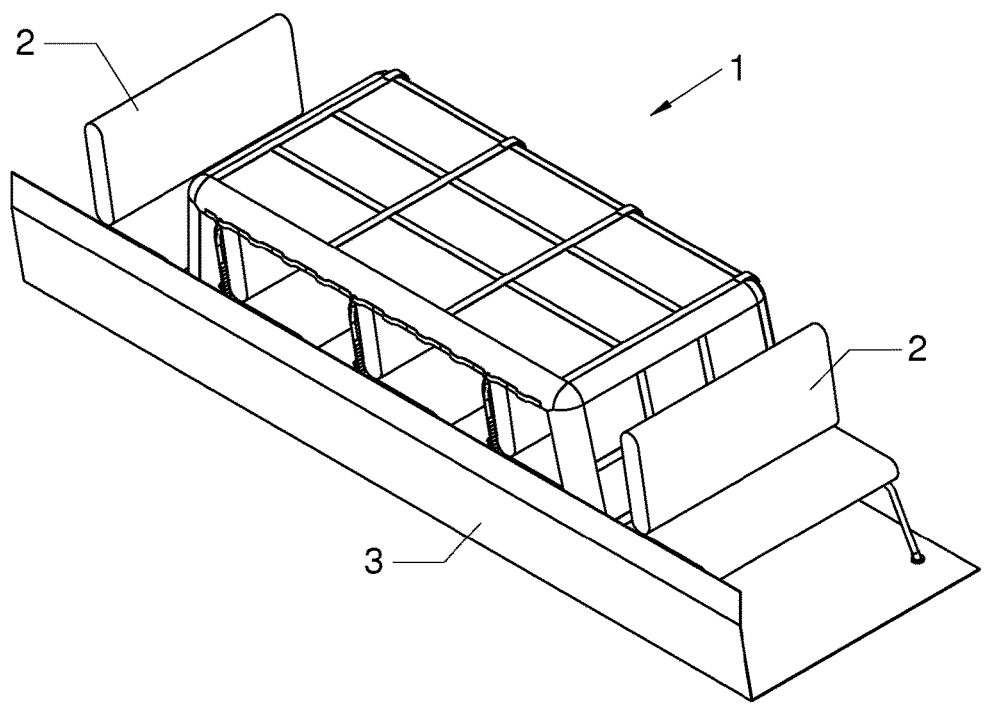
FIG. 2 An isometric view of the baggage restraint system of FIG. 1, as seen from the windows side.

Referring to FIG. 1 and FIG. 2, the baggage restraint system set forth by the present invention is depicted in place in a typical school bus, shown with the immediately adjacent passenger seats (denoted 2) and a section of the cabin floor and sidewall (denoted 3). For clarity, other vehicle parts have been omitted in these figures.

Broadly, the baggage restraint system proposed by the present invention comprises an enclosure (termed "base cell" hereafter, and denoted generally by reference numeral 1), and the means for its securement to the vehicle floor and sidewall. Base cell 1 is constructed as an essentially rectangular or forward-leaning, four-sided cuboid, that is dimensioned to closely envelope a predetermined number of passenger seats—three, in the depicted embodiment (the term "seat", as used hereafter and in the appended claims, is intended to encompass both single-occupant seats and multi-occupant benches/row-seats). When deployed, base cell 1 thus fully contains baggage stowed upon or underneath the aforesaid encased seats. In this and other preferred embodiments, base cell 1 is essentially open on the vehicle's windows side, as seat and sidewall structure do not normally permit a full wall on this side. Lateral baggage displacement in that direction is inherently limited, of course, by the presence of the windows and sidewall. Base cell 1 may alternatively be constructed with a partial wall (which does not extend to the floor) on the vehicle's windows side, whereby somewhat greater structural integrity is achieved, as well as enhanced security, as stowed baggage is made obscured, by this wall, from prying eyes.

Figure 3:
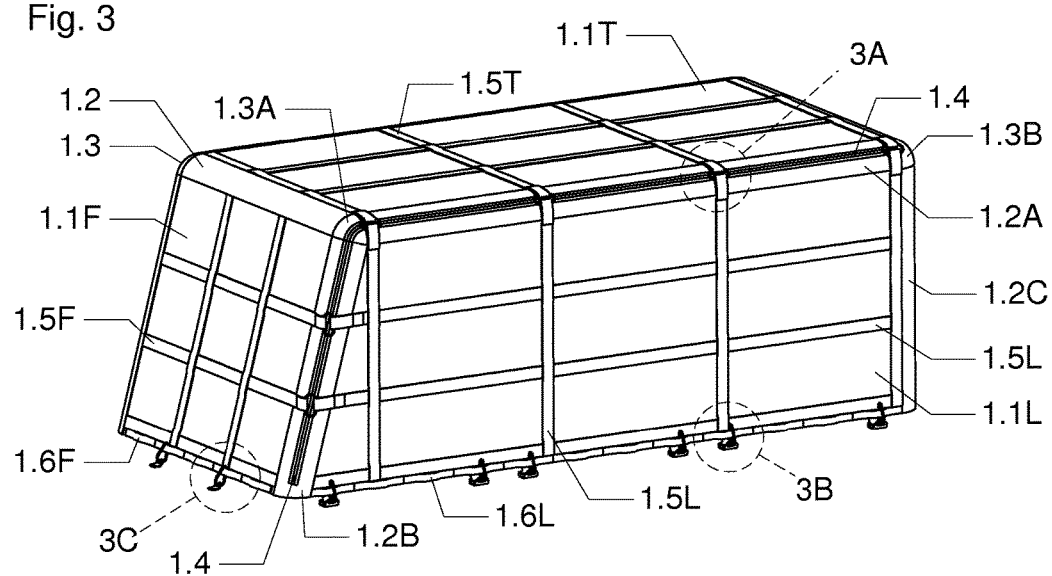
FIG. 3 A perspective aisle-side view of restraint system of FIG. 1, with the vehicle floor and adjacent seats hidden.

Referring now to FIG. 3, base cell 1 comprises four interconnected walls (denoted generally 1.1); edge members (denoted generally 1.2); reinforcing straps (denoted generally 1.5); and hitch straps (denoted generally 1.6).

Walls 1.1 consist of an essentially vertical aisle-side wall (denoted 1.1L), an essentially vertical or somewhat inclined front wall (denoted 1.1F), an essentially vertical or somewhat inclined back wall (denoted 1.1B; best seen in FIG. 10), and an essentially horizontal top wall (denoted 1.1T). Walls 1.1 are formed of durable synthetic fabric, such as (but not limited to) Cordura® or ballistic nylon, but as will be appreciated by those skilled in the art, a wide range of durable synthetic, natural, and mixed-fibre fabrics are commercially available from which walls 1.1 may be constructed. Furthermore, strap or cord netting may be employed alternatively in lieu of solid fabric.

Edge members 1.2 and the corner sections therebetween (denoted generally 1.3) serve to join each pair of walls, thereby to form base cell 1 into the aforesaid rectangular or forward-leaning cuboid geometry, and lend durability and rigidity to its structure. Walls 1.1 are sewn onto edge members 1.2 in the preferred embodiments, but it will be apparent to the skilled technician that walls 1.1 may also be riveted to edge members 1.2 or connected detachably thereto by zippers. Edge members 1.2 are formed of durable synthetic strapping material similar or identical to that forming walls 1.1, in thickness which yields the desired durability and rigidity.

Although in the preferred embodiments a windows-side wall is absent, edge members are still provided on this side, as they help maintain the geometry of the structure. Alternative, simpler embodiments may forgo windows-side edge members. Other embodiments, simpler still, are also possible, wherein edge members are omitted altogether, interfacing walls 1.1 directly.

Two edge members on the aisle side (denoted 1.2A and 1.2B) and the corner section therebetween (denoted 1.3A) are adapted to accommodate a zipper (denoted 1.4) continuously therethrough, thereby allowing aisle-side access to stowed baggage. Zipper 1.4 may alternatively extend into the conterminous, third aisle-side edge member (denoted 1.2C), through the corner section therebetween (denoted 1.3B), to further facilitate access to baggage. In alternative embodiments, a top zipper may be provided along two or three edge members of wall 1.1T, in place of or in addition to zipper 1.4, in order to enable access to stowed baggage from the top side. In embodiments where edge members 1.2 are absent, an access zipper may be integrated directly into wall 1.1L or 1.1T (or into both walls), peripherally, along two or three sides thereof.

Reinforcing straps 1.5 are sewn onto walls 1.1 and edge members 1.2 in a generally latticework pattern—representative straps 1.5L, 1.5F, 1.5B, and 1.5T are depicted attached to the correspondingly suffixed wall. Reinforcing straps 1.5 permits the use of thinner wall material than otherwise would be desired. In alternative embodiments, thicker wall material may be selected to obviate the need for reinforcing straps. Straps 1.5 are constructed of material identical or similar to that forming edge members 1.2.

Figure 3C:
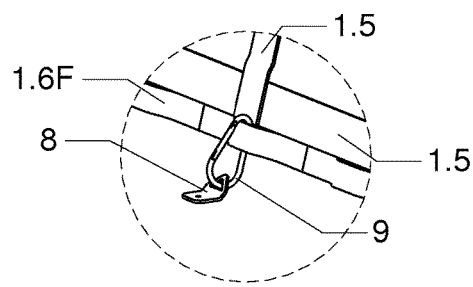
FIG. 3C A detail view of a floor tab anchoring feature of the restraint system seen in FIG. 3, corresponding to focus area 3C.
Figure 3A:
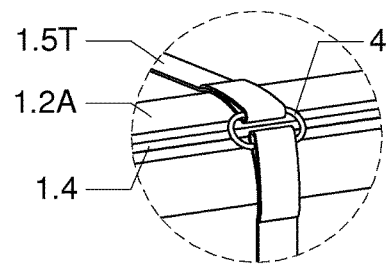
FIG. 3A A detail view of a zipper failure protection feature of the restraint system seen in FIG. 3, corresponding to focus area 3A.

Several of straps 1.5L, 1.5F, and 1.5T terminate adjacent zipper 1.4, as seen in area 3A of FIG. 3 and more clearly in FIG. 3A. Each of these straps is adapted with a depending looped end, the end loops of each conterminous pair of straps are linked by a metal carabiner (denoted 4). This arrangement protects zipper 1.4 from failure in the event of compromising stress, and permits the use of a zipper of a conventional gauge. In alternative embodiments, where a specialty, heavy gauge zipper is used, zipper failure protection is optional.

Figure 10:
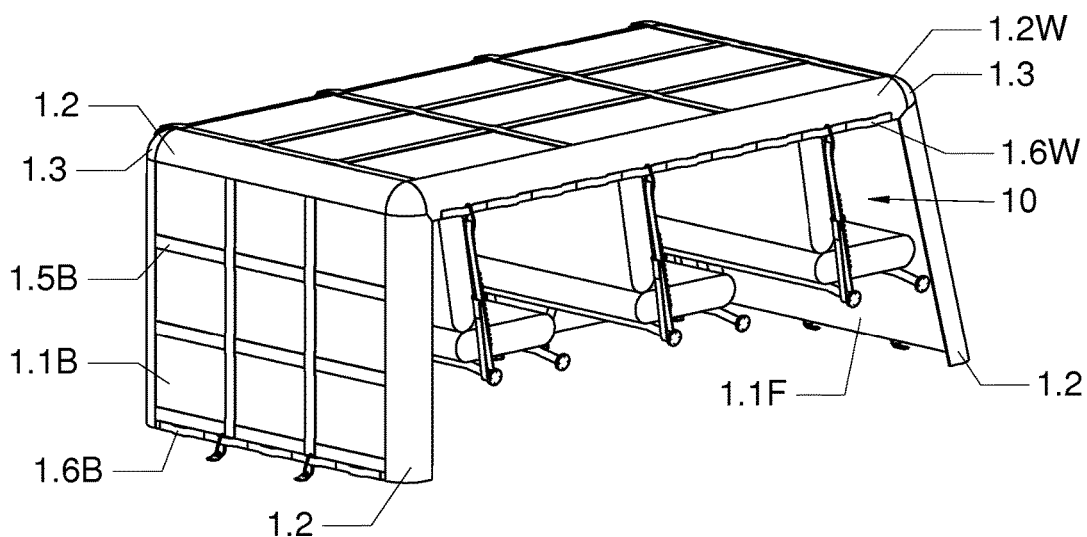
FIG. 10 A perspective, windows-side view of the restraint system seen in FIG. 3, fitted with the adjustable straps of FIG. 8.

Affixed peripherally along the bottom edge of each wall 1.1L, 1.1F, and 1.1B are hitch straps 1.6L, 1.6F, and 1.6B, respectively, by which base cell 1 may be secured to cabin floor 3. As seen in FIG. 10, a hitch strap (denoted 1.6W) similar to 1.6L is disposed along the bottom edge of the edge member on the vehicle's windows side (denoted 1.2W), by which base cell 1 may be secured to the vehicle's windows side (as explained below). In embodiments where windows-side edge members are absent, hitch strap 1.6W may be affixed onto wall 1.1T, along and abutting or adjacent the window-side border thereof.

Hitch straps 1.6, in the preferred embodiments, are sewn onto the associated wall, but, as will be clear to the skilled technician, may alternatively be riveted thereto or connected by any other conventional means of fabric attachment which provides the desired reliability.

Figure 4:
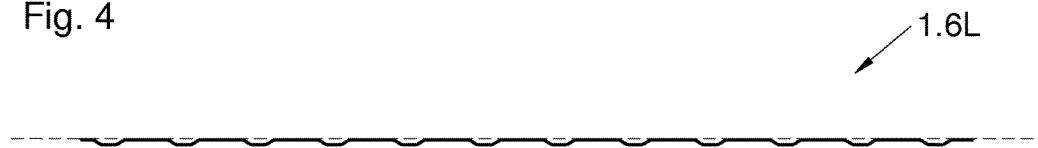
FIG. 4 An orthogonal top view of a hitch strap of the restraint system seen in FIG. 3.

As seen more clearly in FIG. 4 (depicting strap 1.6L as an example), each of straps 1.6 is affixed to its associated wall in such a manner that interstices are formed along its length at regular intervals. Each such opening ("hitch loop", hereafter) being susceptible to linkage by some linking device—a metal carabiner, in the preferred embodiments.

Figure 3B:
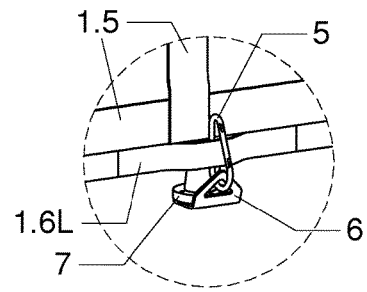
FIG. 3B A detail view of a seat-mount anchoring feature of the restraint system seen in FIG. 3, corresponding to focus area 3B.
Figure 5:
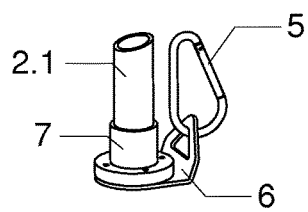
FIG. 5 A larger scale perspective view of the seat-mount anchoring seen in FIG. 3B.
Figure 6:
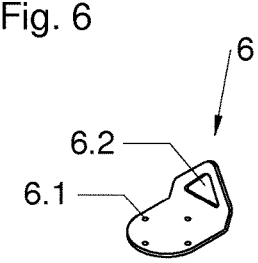
FIG. 6 A larger scale perspective view of a first form of a floor anchor tab seen in FIG. 5.

The preferred linking arrangement along wall 1.1L is shown in area 3B of FIG. 3, seen more clearly in FIG. 3B and FIG. 5-6. A seat-mount anchor tab (denoted 6) is provided for each seat mount fixture (denoted 7) of each seat to be encased. Each seat-mount anchor tab 6 is formed or adapted with registering holes at a base section thereof, as seen in FIG. 6 (denoted 6.1), to permit the passage of the mounting bolts which secure seat mounts fixtures 7 to cabin floor 3, and is disposed therebetween. Anchor tab 6 is also adapted with an opening (denoted 6.2) formed in an inclined flange extending therefrom, which is engaged by a metal carabiner (denoted 5) and linked to a conveniently located hitch loop of strap 1.5L Although carabiners are used advantageously here and elsewhere in the preferred embodiments, in alternative embodiments other linking device may be used instead, such as (but not limited to) heavy-gauge twist ties, nylon ties, tied lengths of rope, hook-and-loop straps, or short buckle straps.

Figure 7:
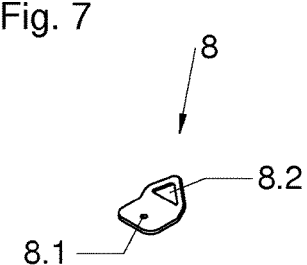
FIG. 7 A larger scale perspective view of a second form of a floor anchor tab seen FIG. 3C.

As shown in area 3C of FIG. 3 and seen more clearly in FIG. 3C and FIG. 7, hitch strap 1.6F is releasably linked to a plurality of floor anchor tabs (denoted 8) which are bolted to cabin floor 3. Each anchor tab 8 is formed with a bolt hole (denoted 8.1) at a base section thereof, by which it is affixed to the vehicle floor, and an opening (denoted 8.2) in an inclined flange section thereof, which is engaged by a metal carabiner (denoted 9; identical to carabiner 5) and linked to a conveniently located hitch loop of strap 1.6F. A similar arrangement is provided for hitch strap 1.6B.

In vehicles where no distinct seat-mounts exist, or where anchor tab 6 cannot be coupled to existing seat-mounts, a plurality of anchor tabs similar or identical to tab 8 may be affixed to the cabin floor along hitch strap 1.6L by which to secure wall 1.1L.

In alternative embodiments, intended for use with relatively light-weight baggage, hitch straps 1.6F and 1.6B are optional. Embodiments are also contemplated where in place of hitch straps 1.6, walls 1.1L, 1.1F, and 1.1B, and edge member 1.2W are fitted with a plurality of individual depending loops, or adapted with grommet eyes at regular intervals along and adjacent the bottom edge thereof, by which carabiner engagement is effected. (In embodiments foregoing windows-side edge members, a plurality of one of the aforesaid fittings may be incorporated directly into wall 1.1T, along and adjacent the windows-side border thereof.)

Figure 8:
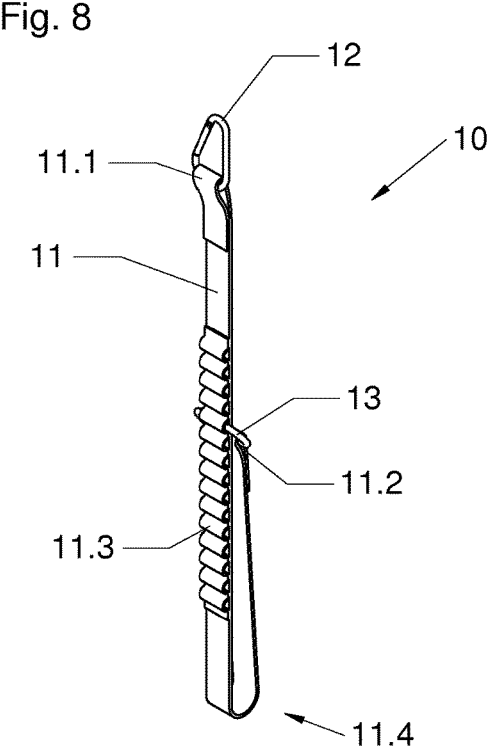
FIG. 8 An isometric view of a first form of a windows-side adjustable strap of the restraint system seen in FIG. 3, in isolation.

On the vehicle's windows side, hitch strap 1.6W is attached by a plurality of adjustable straps, seen in FIG. 10 (denoted generally 10) to any seat frame component susceptible to such engagement. In the embodiment presented, each adjustable strap 10 engages one of the sidewall mounting arms of the corresponding seat. Those skilled in the art will appreciate that vehicle seat designs vary widely, and although sidewall mounting arms may not always be present, some frame member is almost always available for strap engagement. Adjustable strap 10, seen in isolation in FIG. 8, comprises an elongated body (denoted 11) that is coupled to an auxiliary strap (denoted 11.3) in such a manner that a plurality of interstices ("set loops", hereafter) is formed therebetween. Body 11 is further adapted with end loops at either end—a proximal end loop (denoted 11.1), by which it is linked by a carabiner (denoted 12 and identical to carabiner 5) to hitch strap 1.6W, and a distal end loop (denoted 11.2) which carries a second carabiner (denoted 13). Carabiner 13 allows end loop 11.2 to be connected to any one of the aforesaid set loops formed by auxiliary strap 11.3, thus to set strap 10 at the proper length, while forming a bight (denoted generally 11.4) for embracing a suitable seat frame member. Those of skill in the art will recognize that a wide variety of adjustable strap designs exists, many of which could be employed alternatively with equal effectiveness.

Figure 9:
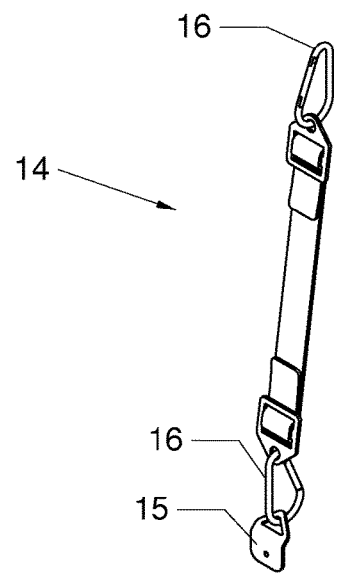
FIG. 9 An isometric view of a second form of a windows-side adjustable strap of the restraint system seen in FIG. 3, in isolation.
Figure 11:
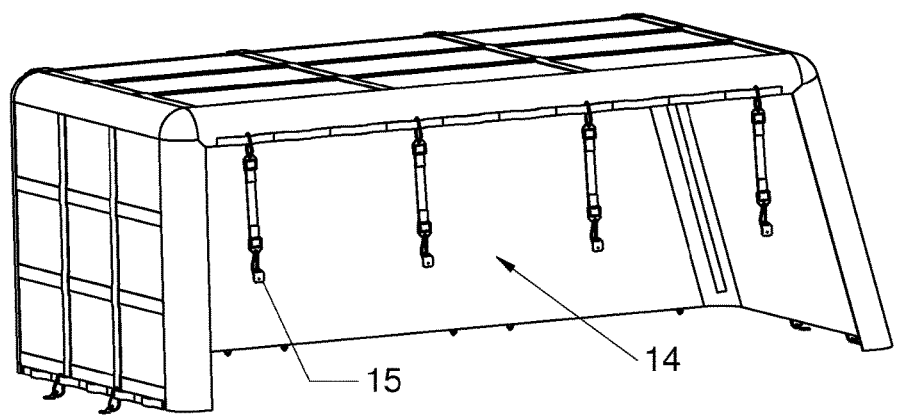
FIG. 11 A perspective, windows-side view of the restraint system of FIG. 1 in isolation, fitted with the adjustable straps of FIG. 9.

Referring now to FIG. 9 and FIG. 11, in an alternative embodiment, where no suitable seat component is available for strap engagement on the vehicle's windows side, a plurality of sidewall anchor tabs (denoted 15; similar or identical to floor tab 8) is affixed to the vehicle sidewall, to which hitch strap 1.6W is then linked. An adjustable strap of any conventional design may be employed for this connection, such as the double-buckle strap depicted in FIG. 9 (denoted generally 14). Metal carabiners (denoted 16; similar or identical to carabiner 5) link strap 14 to hitch strap 1.6W proximally, and to sidewall tabs 15 distally. This arrangement is shown in FIG. 11.

Figure 12:
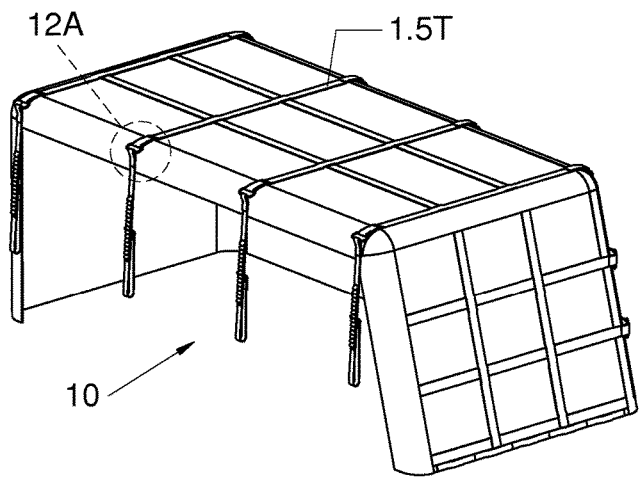
FIG. 12 An isometric view of a second embodiment of the baggage restraint system of FIG. 1 in isolation, showing an alternative method of attachment of the adjustable straps of FIG. 8.
Figure 12A:
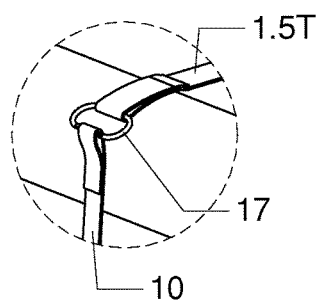
FIG. 12A A detail view of the alternative method of attachment of the adjustable straps seen in FIG. 12, corresponding to focus area 12A.
Figure 13:
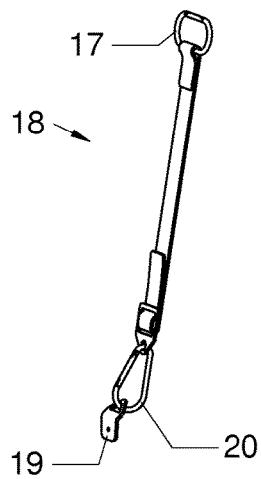
FIG. 13 An isometric view of a second form of an adjustable strap used with the alternative embodiment of the restraint system seen in FIG. 12, in isolation.
Figure 14:
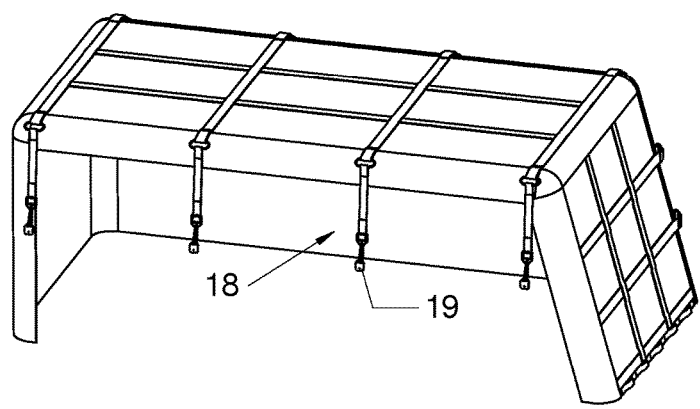
FIG. 14 A perspective view of the alternative embodiment of the restraint system seen in FIG. 12, fitted with the adjustable straps of FIG. 13.

Referring to FIG. 12-14, an alternative embodiment employs a second method of securing base cell 1 to the vehicle sidewall, whereby, in lieu of hitch strap 1.6W, some or all reinforcement straps 1.5T which terminate on the windows side, are extended with a depending looped end. A carabiner (denoted 17; similar or identical to carabiner 4) links each such end loop to an instance of the aforesaid adjustable strap 10.

In the foregoing embodiment, where no seat component is available for strap engagement on the windows side, a plurality of anchor tabs (denoted 19; identical to anchor tab 15) is affixed to the vehicle sidewall, each tab 19 linked by a carabiner (denoted 20; identical to carabiner 5) to an adjustable strap, such as (but not limited to) the one-buckle strap depicted in FIG. 13 (generally denoted 18). Adjustable strap 18 in turn is linked by carabiner 17, as before, to the end loop of the respective strap 1.5T.

Figure 15:
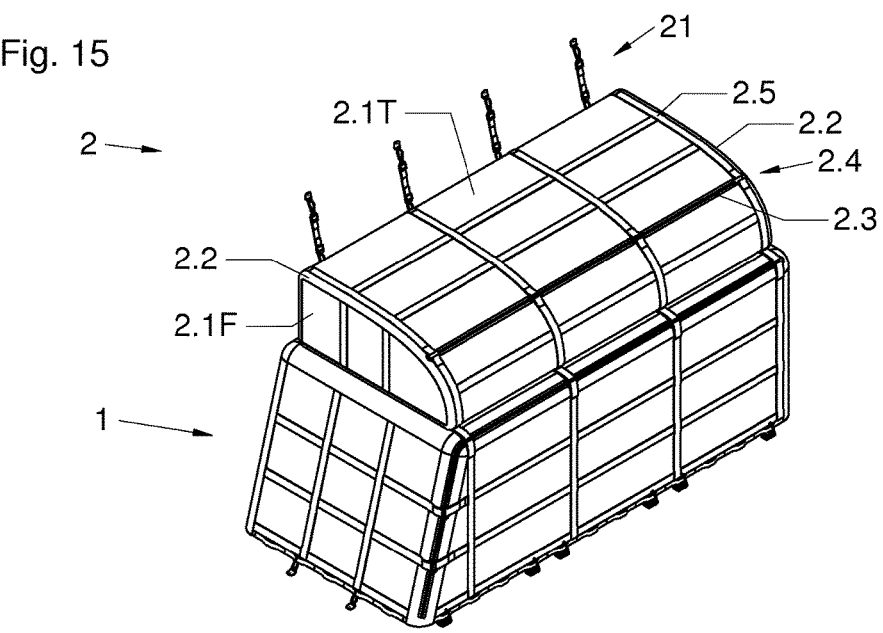
FIG. 15 A perspective view of a second configuration of the baggage restraint system according to the present invention, featuring an auxiliary top compartment.
Figure 16:
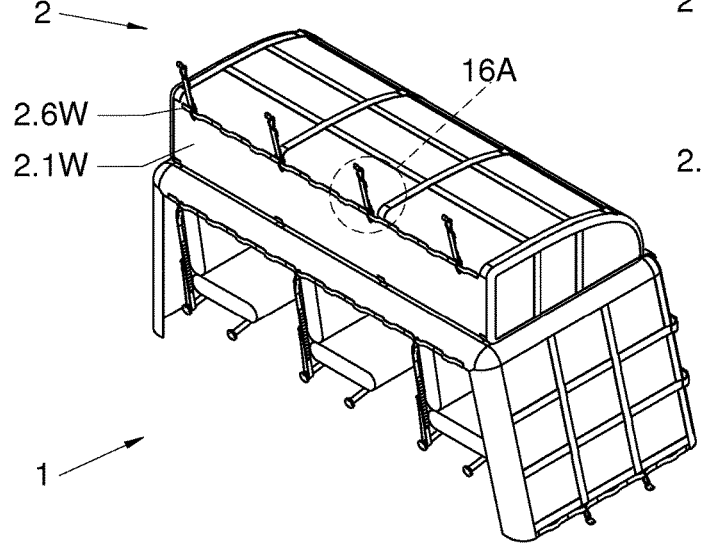
FIG. 16 An isometric, windows-side view of the restraint system seen in FIG. 15.
Figure 16A:
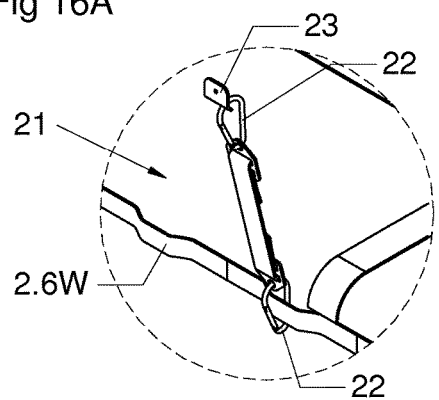
FIG. 16A A detail view of one of the adjustable straps linked to the auxiliary compartment seen in FIG. 16, corresponding to focus area 16A.

Referring lastly to FIG. 15 and FIG. 16, an auxiliary compartment (termed "top cell" hereafter, and denoted generally by the reference numeral 2) is optional with any of the foregoing embodiments. Top cell 2, in the preferred embodiments, is formed of the same or similar material forming base cell 1, and is constructed as a complete enclosure comprising a top/aisle-side wall (denoted 2.1T), a bottom wall (not shown), a windows-side wall (denoted 2.1W), a front wall (denoted 2.1F), and a back wall (not shown). Walls 2.1T and 2.1W, and the bottom wall are formed continuously, in the embodiment presented, from a single panel, defining a flat-bottomed, tube-like structure to which walls 2.1F and 2.1B are attached by edge members (denoted 2.2). In alternative embodiments, walls 2.1T and 2.1W, and the bottom wall may be formed separately and connected directly or joined by edge members.

Top cell 2 features similar components to those found on base cell 1: edge members (as described above); zipper (denoted 2.3); zipper failure protection (denoted generally 2.4); reinforcement straps (denoted generally 2.5).

Again, it will be apparent to those of skill in the art that a range of alternatives exists respecting the particular cell geometry and, as with connection to base cell 1, respecting the arrangement (or presence) of reinforcement straps 2.5, and the exact routing of zipper 2.3.

Top cell 2, in the embodiment presented, rests freely atop base cell 1, and is secured to the vehicle sidewall as follows: a hitch strap (denoted 2.6W), similar or identical to hitch strap 1.6W of base cell 1, is affixed along the top edge of wall 2.1W; a plurality of adjustable straps is provided (denoted generally 21; similar or identical to strap 14), disposed at regular intervals along hitch strap 2.6W, where each strap 21 is linked by a first carabiner (denoted 22; identical to carabiner 5) to hitch strap 2.6W, and by a second, identical carabiner to an anchor tab (denoted 23; identical to anchor tab 15), which is affixed to the vehicle sidewall on the windows side.

In another preferred embodiment, top cell 2 is releasably attached to base cell 1, in which case securement of top cell 2 to the vehicle sidewall, though advantageous, is optional. Releasable attachment of cell 2 to cell 1 may be effected by various conventional methods well known in the art, such as (but not limited to): coupling depending straps connected to each cell—which coupling may be achieved by means of a buckle, hook-and-loop sections, hook-and-eye arrangement, or the like; carabiner-linking depending loops extending from each cell; using a continuous, at least partly peripheral split-flange zipper, wherein one flange is sewn along a top part of base cell 1 while the other is sewn along a bottom part of top cell 2.

It is to be understood that the forgoing description of the preferred embodiments of the present invention and the accompanying drawings are intended to better elucidate the invention by way of examples, and not in any way to narrow its purview or the scope of the appended claims to the embodiments exemplified.

The invention claimed is:

1. A restraint system for the containment of baggage to within at least a space occupied by two or more successive seats in a commercial passenger vehicle, comprising:
   (a) an enclosure comprising:
      (i) an essentially vertical aisle-side wall;
      (ii) an essentially vertical or an inclined front wall;
      (iii) an essentially vertical or an inclined back wall;
      (iv) an essentially horizontal top wall;
   (b) a first set of plurality of depending loops or grommet eyes, disposed longitudinally adjacent the bottom edge of said aisle-side wall, each of which loops or grommet eyes being susceptible to engagement by a linking device;
   (c) a second set of plurality of depending loops or grommet eyes, disposed longitudinally adjacent the windows-side edge of said top wall, each of which loops or grommet eyes being susceptible to engagement by a linking device;
   (d) a plurality of anchor tabs, each of which tabs having a base section and a flange extending therefrom, said base section having at least one hole bored therethrough, by which it may be affixed to a cabin floor or wall of a target vehicle; said flange having an opening formed therethrough, which flange being susceptible to engagement by a linking device;
   (e) a plurality of adjustable straps, each of which straps being formed with a loop at both ends thereof, each of which loops being susceptible to engagement by a linking device;
   (f) a plurality of linking devices, capable of readily engaging and disengaging parts offering contiguous engagement loci;
      wherein, for deployment in a given target vehicle, said enclosure is dimensioned and shaped to closely envelope a predetermined number of seats in said target vehicle; wherein, prior to deployment, each of said anchor tabs is affixed to the cabin floor of said target vehicle, on the aisle side of each seat to be encased; and wherein, upon deployment, each of said anchor tabs is linked by one of said linking devices to one of said depending loops or grommet eyes on the aisle side, while each of said adjustable straps is linked proximally to one of said depending loops or grommet eyes on the windows-side, and linked distally to any convenient fixed frame member on the windows side of the nearest encased seat.

2. The restraint system set forth in claim 1, wherein said enclosure walls are interconnected by interfacing edge members, which interconnection being detachable.

3. The restraint system set forth in claim 1, wherein said base section of each of said anchor tabs, conforms with registering holes to the base of the seat-mount fixtures of said target vehicle and to the cabin floor area underneath, and is affixed therebetween.

4. The restraint system set forth in claim 1, wherein said depending loops of said aisle-side wall, are manifested as successive interstices in a strap which is affixed at regular intervals thereto.

5. The restraint system set forth in claim 1, wherein said depending loops adjacent the windows-side edge of said top wall, are manifested as successive interstices in a strap which is affixed at regular intervals thereto.

6. The restraint system set forth in claim 1, further comprising a plurality of depending loops or grommet eyes disposed along and adjacent the bottom edge of said front wall, or back wall, or of both walls, each of which loops or grommet eyes being susceptible to engagement by said linking device to one of said anchor tabs.

7. The restraint system set forth in claim 6, wherein said depending loops, are manifested as successive interstices in a strap which is affixed at regular intervals to the respective said wall.

8. The restraint system set forth in claim 1, wherein each of said adjustable straps is formed distally with a bight, thereby to embrace, when deployed, a fixed frame member on the windows-side of the nearest enveloped seat, which is susceptible to such engagement.

9. The restraint system set forth in claim 1, wherein each of said adjustable straps, when deployed, is linked distally to one of said anchor tabs, which is affixed to the cabin sidewall on the windows side of said target vehicle.

10. The restraint system set forth in claim 1, wherein said linking device is a carabiner.

11. The restraint system set forth in claim 1, further comprising at least one zipper, which zipper being incorporated into said aisle-side wall, or into said top wall, or into both of said walls, or is built into two or more interfacing edge members, if present, thereby to facilitate access to stowed baggage.

12. The restraint system set forth in claim 11, further comprising one or more sets of reinforcing straps, the straps of each of which sets being affixed to an associated one of said walls, spanning longitudinally and laterally the surface thereof in a generally latticework pattern, wherein conterminous pairs of said reinforcing straps which terminate adjacent said zipper are adapted with depending looped ends, which ends being linked by said linking device.

13. The restraint system set forth in claim 1, further comprising one or more sets of reinforcing straps, the straps of each of which sets being affixed to an associated one of said walls, spanning longitudinally and laterally the surface thereof in a generally latticework pattern.

14. The restraint system set forth in claim 13, wherein each of said adjustable straps is linked proximally to a depending loop extending from the windows-side end of each of said reinforcing straps which is affixed to said top wall and terminates at said end.

15. The restraint system set forth in claim 1, further comprising an auxiliary compartment, which compartment being constructed as a fully closed, flat-bottomed cell, and is disposed, when deployed, atop said enclosure.

16. The restraint system set forth in claim 15, wherein said auxiliary compartment is detachably secured to said enclosure, when deployed.

17. The restraint system set forth in claim 15, wherein said auxiliary compartment is resting freely upon said enclosure, when deployed, and is secured to the vehicle's sidewall on the windows side via said adjustable straps, and said anchor tabs.

\* \* \* \* \*